US012738619B2

(12) United States Patent
Li et al.

(10) Patent No.: US 12,738,619 B2
(45) Date of Patent: Sep. 15, 2026

(54) DIELECTRIC FILTER

(71) Applicant: Telefonaktiebolaget LM Ericsson (publ), Stockholm (SE)

(72) Inventors: Jingpeng Li, Beijing (CN); Juandi Song, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 146 days.

(21) Appl. No.: 18/833,559

(22) PCT Filed: Jan. 9, 2023

(86) PCT No.: PCT/CN2023/071327
§ 371 (c)(1),
(2) Date: Jul. 26, 2024

(87) PCT Pub. No.: WO2023/143003
PCT Pub. Date: Aug. 3, 2023

(65) Prior Publication Data

US 2025/0141076 A1 May 1, 2025

(30) Foreign Application Priority Data

Jan. 28, 2022 (CN) ......................... 202220238647.8

(51) Int. Cl.
*H01P 1/20* (2006.01)
*H01P 1/08* (2006.01)
*H01P 7/10* (2006.01)

(52) U.S. Cl.
CPC .............. *H01P 1/2002* (2013.01); *H01P 1/08* (2013.01); *H01P 7/10* (2013.01); *H01P 7/105* (2013.01)

(58) Field of Classification Search
CPC .. H01P 1/2002; H01P 1/08; H01P 7/10; H01P 7/105
(Continued)

(56) References Cited

U.S. PATENT DOCUMENTS

2006/0082425 A1 4/2006 Jun et al.
2016/0006106 A1 1/2016 Cooper et al.
(Continued)

FOREIGN PATENT DOCUMENTS

CN 109244606 A 1/2019
CN 111816971 A 10/2020
CN 216563467 U 5/2022

OTHER PUBLICATIONS

User Guide for Ansoft High Frequency Structure Simulator (Year: 2005).*
(Continued)

*Primary Examiner* — Andrea Lindgren Baltzell
*Assistant Examiner* — Victor Cole
(74) *Attorney, Agent, or Firm* — FBT Gibbons LLP

(57) ABSTRACT

The present disclosure relates to a dielectric filter. It comprises a first single-mode dielectric resonator, a second single-mode dielectric resonator, and a triple-mode dielectric resonator arranged side by side in sequence in a first direction, adjacent dielectric resonators being coupled by coupling windows provided between their opposite surfaces, characterized in that the coupling windows between the first single-mode dielectric resonator and the second single-mode dielectric resonator comprise a first main coupling window and a first cross coupling window. A length of the first main coupling window measured along a second direction is greater than half of a length measured along the second direction, of a filter cross section where the first main coupling window is located, and a width of the first main coupling window measured along a third direction is less than half of a width measured along the third direction, of the filter cross section where the first main coupling window is located, the first direction, the second direction and the third direction being three dimensional extension directions of the dielectric filter. A length of the first cross coupling
(Continued)

window measured along the second direction is less than a length of the first main coupling window measured along the second direction.

19 Claims, 7 Drawing Sheets

(58) Field of Classification Search
USPC .......................................................... 333/208
See application file for complete search history.

(56) References Cited

U.S. PATENT DOCUMENTS

2018/0131063 A1* 5/2018 Zhu ....................... H01P 1/2082
2021/0167483 A1 6/2021 Wu et al.

OTHER PUBLICATIONS

European Search Report dated Jan. 19, 2026, for European Patent Application No. 23745887.2.
David R. Hendry et al., "Triple-Mode Ceramic Cavity Filters With Wide Spurious-Free Performance", IEEE Transactions on Microwave Theory and Techniques, Oct. 1, 2017, 9 pages, vol. 65, No. 10.

* cited by examiner

DIELECTRIC FILTER

This application is a national-phase entry under 35 USC § 371 of International Application No. PCT/CN2023/071327, filed Jan. 9, 2023, titled "A Dielectric Filter," which claims priority to Chinese Application No. 202220238647.8, filed Jan. 28, 2022, titled "A Dielectric Filter," the contents of which are hereby incorporated herein in their entirety.

TECHNICAL FIELD

The present disclosure relates to the technical field of components of communication equipments, more particularly, to a dielectric filter.

BACKGROUND

This section introduces aspects that may facilitate better understanding of the present disclosure. Accordingly, the statements of this section are to be read in this light and are not to be understood as admissions about what is in the prior art or what is not in the prior art.

As an important part of the mobile communication system, the base station (BS) is usually composed of a base station unit, a radio frequency (RF) unit, and an antenna. In a traditional base station solution, the remote radio unit (RRU) and antenna unit (AU) are two independent units and hung on high constructions. Considering the installation, fixation and occupation issues, smaller volume and lighter weight has always been an important evolution direction in the design of BS including legacy base station, street macro, micro station, small cell and adaptive antenna system (AAS).

In recent years, with the development of the mobile communication system, the demand for small-size and high-performance radio is growing rapidly. The current advanced radio requires that the size of the whole unit should be miniaturized as much as possible. Therefore, the filter is also required to have an increasingly small volume.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In view of the defects of the prior art, the present disclosure proposes an improved dielectric filter, which enables the transmission zero to be provided at the triple-mode high-order resonant frequency to suppress the spurious.

To solve the above technical problem, the present disclosure proposes a dielectric filter, comprising: a first single-mode dielectric resonator, a second single-mode dielectric resonator, and a triple-mode dielectric resonator arranged side by side in sequence in a first direction, adjacent dielectric resonators being coupled by coupling windows provided between their opposite surfaces. The coupling windows between the first single-mode dielectric resonator and the second single-mode dielectric resonator comprise a first main coupling window and a first cross coupling window. A length of the first main coupling window measured along a second direction is greater than half of a length measured along the second direction, of a filter cross section where the first main coupling window is located. And a width of the first main coupling window measured along a third direction is less than half of a width measured along the third direction, of the filter cross section where the first main coupling window is located. The first direction, the second direction and the third direction are three dimensional extension directions of the dielectric filter. A length of the first cross coupling window measured along the second direction is less than the length of the first main coupling window measured along the second direction.

In an embodiment of the disclosure, the length of the first cross coupling window measured along the second direction is less than half of the length of the first main coupling window measured along the second direction.

In an embodiment of the disclosure, the length of the first main coupling window measured along the second direction is substantially equal to the length measured along the second direction, of the filter cross section where the first main coupling window is located.

In an embodiment of the disclosure, the first main coupling window is located at an edge area of the filter cross section where the first main coupling window is located.

In an embodiment of the disclosure, a blind hole or through hole for adjusting coupling is provided in an area where the first main coupling window is located.

In an embodiment of the disclosure, at least part of a hole wall surface of the blind hole or through hole is metallized.

In an embodiment of the disclosure, the coupling windows between the first single-mode dielectric resonator and the second single-mode dielectric resonator include a plurality of the first cross coupling windows.

In an embodiment of the disclosure, the coupling windows between the second single-mode dielectric resonator and the triple-mode dielectric resonator comprise a first mode coupling window, a second mode coupling window and a third mode coupling window; the first mode coupling window, viewed in terms of a shape of a filter cross section where it is located, is located near a first edge of the shape and is centrally arranged in an extension direction of the first edge, the second mode coupling window, viewed in terms of a shape of a filter cross section where it is located, is located near a second edge of the shape adjacent to the first edge and is centrally arranged in an extension direction of the second edge, and the third mode coupling window, viewed in terms of a shape of a filter cross section where it is located, is located in a corner region of the shape that is opposite to an angle defined by the first edge and the second edge.

In an embodiment of the disclosure, the coupling windows between the second single-mode dielectric resonator and the triple-mode dielectric resonator include a plurality of the first mode coupling windows arranged side by side in a direction perpendicular to the first edge and/or a plurality of the second mode coupling windows arranged side by side in a direction perpendicular to the second edge.

In an embodiment of the disclosure, the dielectric filter comprises a third single-mode dielectric resonator arranged side by side with respect to the triple-mode dielectric resonator in the first direction.

In an embodiment of the disclosure, the coupling windows between the third single-mode dielectric resonator and the triple-mode dielectric resonator comprise a first mode transmission coupling window, a second mode transmission coupling window and a third mode transmission coupling window, wherein the first mode transmission coupling window, viewed in terms of a shape of a filter cross section where it is located, is located near a first edge of the shape and is centrally arranged in an extension direction of the first edge, the second mode transmission coupling window, viewed in terms of a shape of a filter cross section where it is located, is located near a second edge of the shape adjacent to the first edge and is centrally arranged in an extension direction of the second edge, and the third mode transmission coupling window, viewed in terms of a shape of a filter cross section where it is located, is located in a corner region of the shape that is opposite to an angle defined by the first edge and the second edge.

In an embodiment of the disclosure, the coupling windows between the third single-mode dielectric resonator and the triple-mode dielectric resonator are mirror symmetrical with the coupling windows between the second single-mode dielectric resonator and the triple-mode dielectric resonator with respect to a central symmetry plane of the triple-mode dielectric resonator perpendicular to the first direction.

In an embodiment of the disclosure, the dielectric filter comprises a fourth single-mode dielectric resonator arranged side by side with respect to the third single-mode dielectric resonator in the first direction.

In an embodiment of the disclosure, the coupling windows between the fourth single-mode dielectric resonator and the third single-mode dielectric resonator comprise a second main coupling window and a second cross coupling window, wherein a length of the second main coupling window measured along the second direction is greater than half of a length measured along the second direction, of a filter cross section where the second main coupling window is located, a width of the second main coupling window measured along the third direction is less than half of a width measured along the third direction, of the filter cross section where the second main coupling window is located, and a length of the second cross coupling window measured along the second direction is less than the length of the second main coupling window measured along the second direction.

In an embodiment of the disclosure, the length of the second cross coupling window measured along the second direction is less than half of the length of the second main coupling window measured along the second direction.

In an embodiment of the disclosure, the coupling windows between the fourth single-mode dielectric resonator and the third single-mode dielectric resonator are configured to be mirror symmetric with the coupling windows between the first single-mode dielectric resonator and the second single-mode dielectric resonator with respect to a central symmetry plane of the triple-mode dielectric resonator perpendicular to the first direction.

In an embodiment of the disclosure, the first single-mode dielectric resonator, the second single-mode dielectric resonator, the third single-mode dielectric resonator, the fourth single-mode dielectric resonator, and the triple-mode dielectric resonator are ceramic dielectric resonators.

In an embodiment of the disclosure, the dielectric filter is an integral device.

With the help of the first main coupling window and the first cross coupling window, the dielectric filter according to the present disclosure can obtain a transmission zero outside the passband, and suppress the high-order resonant spurious of the triple-mode dielectric resonator. In addition, the first mode coupling window, the second mode coupling window and the third mode coupling window are arranged to improve the high-frequency spurious and thereby improve the filter performance. Therefore, in addition to the advantages of small volume and light weight, the dielectric filter according to the present disclosure has got improved RF performance and elevated reliability and robustness of the filter. Moreover, the dielectric filter of the present disclosure can be integrally formed, leading to flexibility in design, increased productivity, and reduced manufacturing costs.

BRIEF DESCRIPTION OF THE DRAWINGS

These and other objects, features and advantages of the disclosure will become apparent from the following detailed description of illustrative embodiments thereof, which are to be read in connection with the accompanying drawings.

Figure 1:
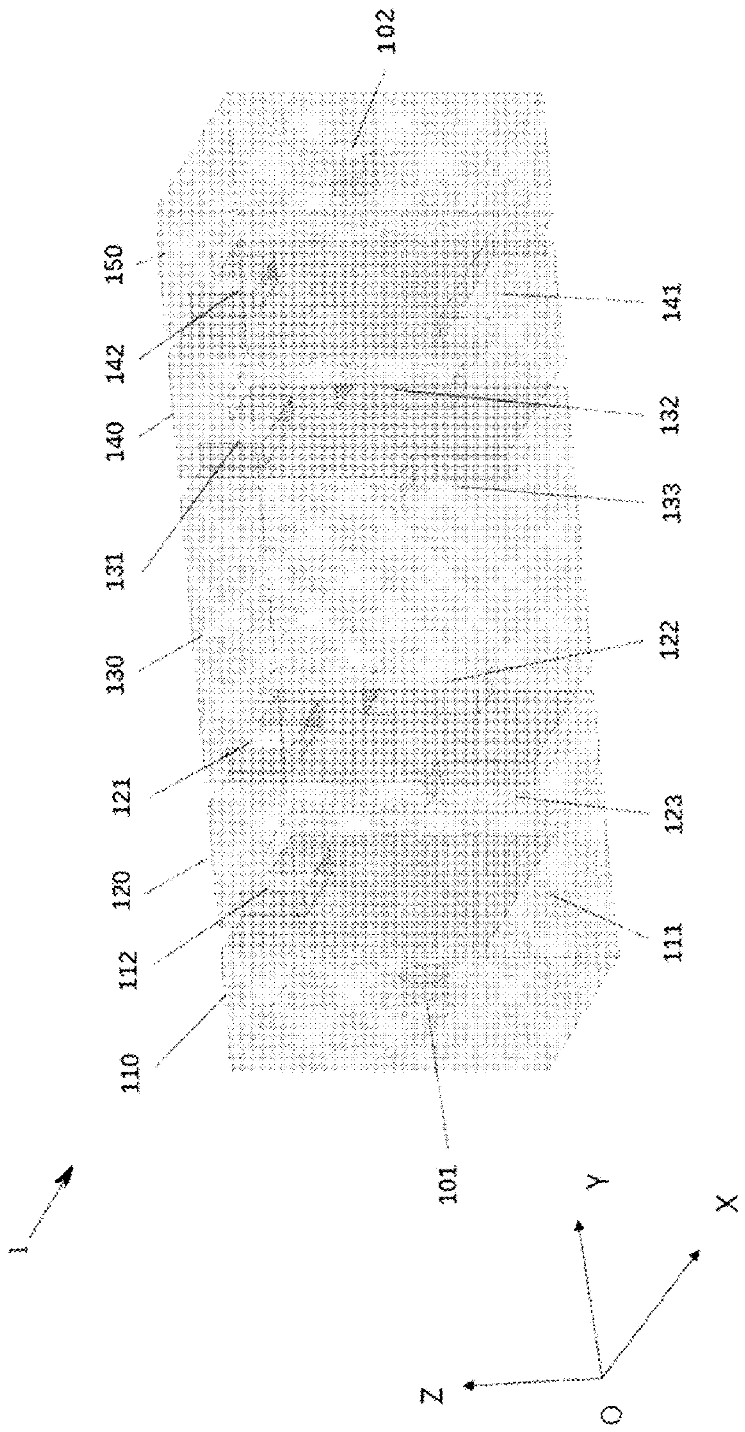
FIG. 1 is a perspective view of the dielectric filter according to the present disclosure.

The drawings are only schematic and are not necessarily drawn to scale. In addition, they only show the parts necessary to illustrate the filter of the present disclosure, and other parts are omitted or only simply mentioned. That is, in addition to the components shown in the drawings, the filter of the present disclosure can also include other components.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The currently used small-size dielectric filter comprises a body made of a solid dielectric material and a metal layer obtained by metallizing a surface of the body (e.g., by silver plating). This type of single-mode filter can be composed of several resonators, each of which has a primary resonant frequency or mode. A multimode filter includes at least one multimode resonator, which can produce multiple resonant frequencies in a single resonator, thereby significantly reducing the size of the filter.

The filter performance will be reduced when only the filter size is reduced, resulting in, e.g. insertion loss or out-of-band attenuation. One way to reduce the filter size while maintaining the high performance is to use multiple modes of each resonant cavity.

At present, the triple-mode dielectric filter is usually composed of several resonator blocks covered with conductive layers. Every two separate resonator blocks are assembled by welding. These resonator blocks are coupled via coupling windows on their opposite sides. This method of assembly by welding involves a complex process, high costs and great difficulty. In addition, because the high-order mode resonant frequency of the triple-mode resonator is very close to that of the fundamental mode, the triple-mode dielectric filter will encounter the out-of-band spurious problem.

The present disclosure aims to make one or more improvements over the prior art.

As shown in FIG. 1, the dielectric filter 1 of the present disclosure is cuboid in shape and has three dimensional extension directions (see the directions X, Y and Z indicated by the arrows in FIG. 1). The dielectric filter 1 comprises a first single-mode dielectric resonator 110, a second single-mode dielectric resonator 120, a triple-mode dielectric resonator 130, a third single-mode dielectric resonator 140, and a fourth single-mode dielectric resonator 150 arranged side by side in the Y direction. These dielectric resonators are constructed as cube-like dielectric resonators with solid dielectric materials inside and a metal conductive layer on the outside. Adjacent dielectric resonators are coupled via coupling windows set between their opposite faces. A signal input blind hole 101 is provided on the side of the first single-mode dielectric resonator 110 that is away from the second single-mode dielectric resonator 120. A signal output blind hole 102 is provided on the side of the fourth single-mode dielectric resonator 150 that is away from the third single-mode dielectric resonator 140. A signal is input to the first single-mode dielectric resonator 110 through the signal input blind hole 101. Through the coupling windows between adjacent dielectric resonators, the signal is transmitted from the first single-mode dielectric resonator 110 to the fourth single-mode dielectric resonator 150, and finally output through the signal output blind hole 102. The resonant cavity of each single-mode dielectric resonator produces only one resonant frequency at the filter passband, while the resonant cavity of the triple-mode dielectric resonator 130 has three resonant frequency modes at the filter passband.

Figure 2:
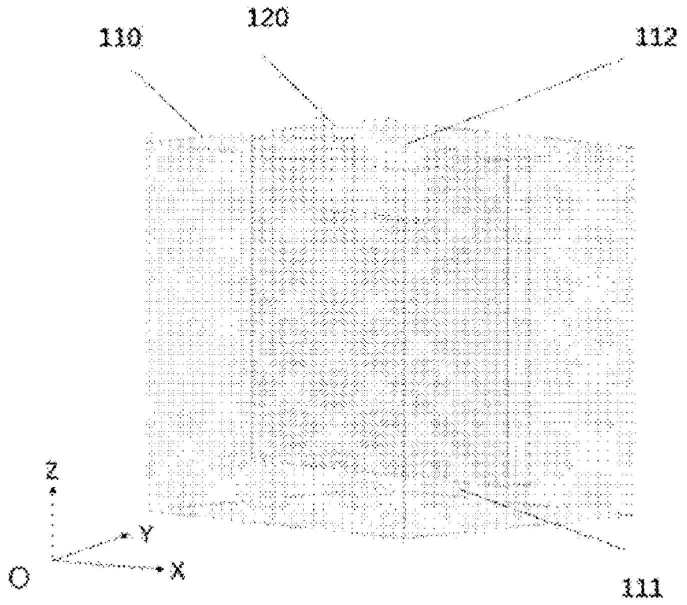
FIG. 2 is a perspective view of a portion of the dielectric filter of the present disclosure comprising a first single-mode dielectric resonator and a second single-mode dielectric resonator.
Figure 3A:
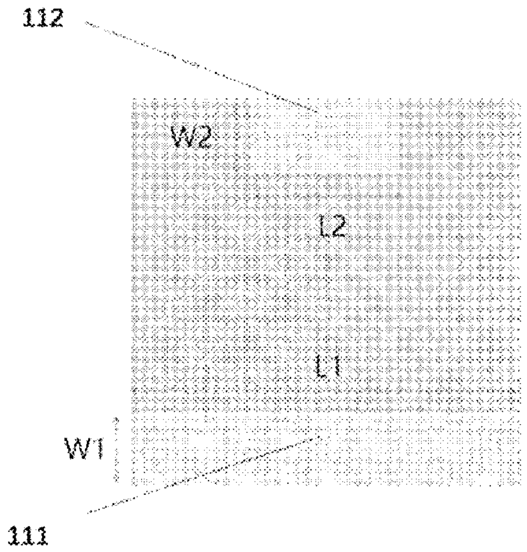
FIG. 3A is a schematic view of the cross section where the coupling windows shown in FIG. 2 are located.

In the embodiment shown in FIG. 1, the coupling windows between the first single-mode dielectric resonator 110 and the second single-mode dielectric resonator 120 include the first main coupling window 111 and the first cross coupling window 112. As shown in FIGS. 2 and 3A, the first main coupling window 111 is located at a lower edge area of the filter cross section where the first main coupling window 111 is located. The first cross coupling window 112 is arranged separately from the first main coupling window 111, and is located at an upper edge area of the filter cross section (i.e., in a Z-O-X plane) where the first cross coupling window 112 is located. The length L1 of the first main coupling window 111 measured along the second direction X is greater than half of the length measured along the second direction, of the filter cross section where the first main coupling window 111 is located. In the illustrated embodiment, the length L1 of the first main coupling window 111 measured along the second direction X is substantially equal to the length measured along the second direction, of the filter cross section where the first main coupling window 111 is located. The width W1 of the first main coupling window 111 measured along the third direction Z is less than half of the width measured along the third direction, of the filter cross section where the first main coupling window 111 is located. The length L2 of the first cross coupling window 112 measured along the second direction X is less than the length L1 of the first main coupling window 111 measured along the second direction. In a preferred embodiment, the length L2 of the first cross coupling window 112 measured in the second direction is less than half of the length L1 of the first main coupling window 111 measured in the second direction. With the help of the first main coupling window 111 and the first cross coupling window 112, high selectivity of the filter and a transmission zero at the out of pass band can be achieved, so as to suppress the high-order resonant spurious of the triple-mode dielectric resonator 130. When the first main coupling window 111 provides capacitive coupling, the transmission zero is located at a higher side of the passband. Otherwise, when the first main coupling window 111 provides inductive coupling, the transmission zero is at a lower side of the passband. The first main coupling window 111 functions to produce capacitive or inductive coupling, depending on its size.

Figure 3B:
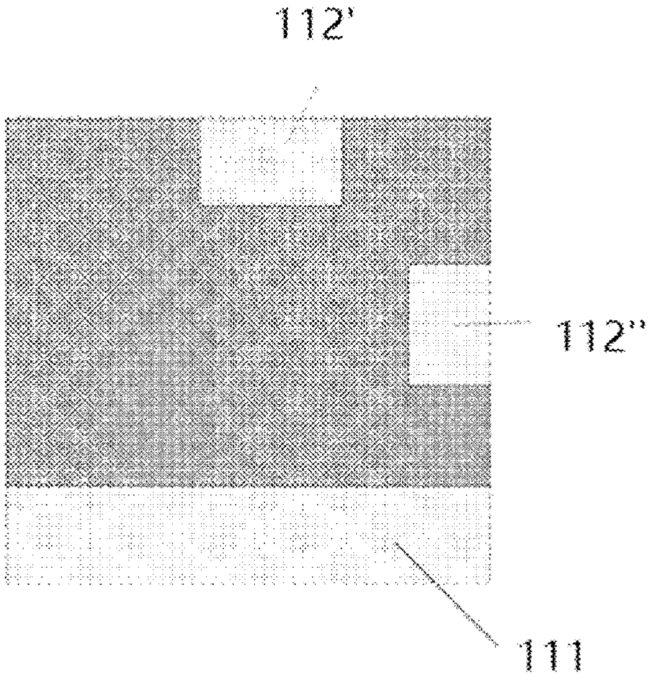
FIG. 3B is a variant of the arrangement of the coupling windows shown in FIG. 3A.
Figure 3C:
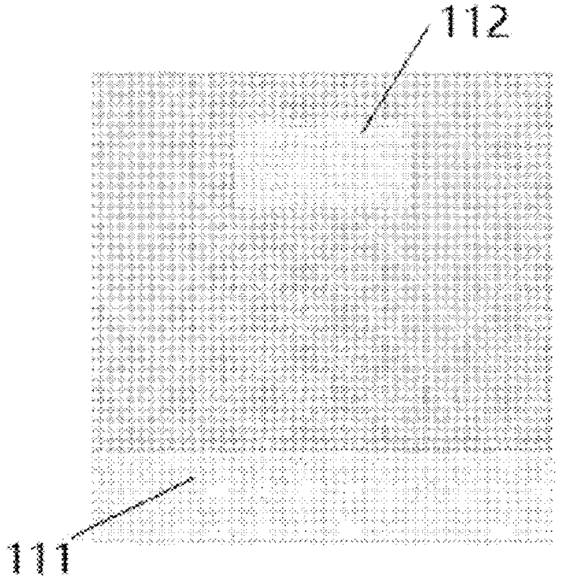
FIG. 3C is another variant of the arrangement of the coupling windows shown in FIG. 3A.

Although only one first cross coupling window 112 is shown in FIG. 3A, it should be understood that the coupling window between the first single-mode dielectric resonator and the second single-mode dielectric resonator can include a plurality of first cross coupling windows 112', 112", as shown in FIG. 3B. The position of the first cross coupling window 112 is not limited to the edge area of the filter cross section as shown in FIG. 3B. For example, the first cross coupling window 112 can also be arranged near a central area of the filter cross section, as shown in FIG. 3C, as long as it is separate from the first main coupling window. Similarly, the position of the first main coupling window is not limited to the edge area of the filter cross section as shown in FIG. 3C. For example, the first main coupling window may be wholly displaced toward the central area of the filter cross section where the first main coupling window is located.

Figure 4:
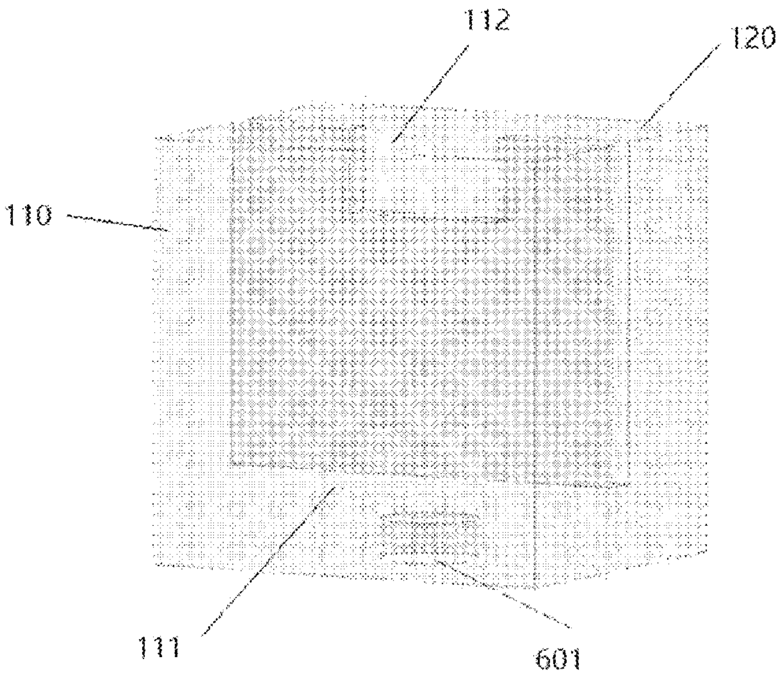
FIG. 4 is a variant of the portion of the dielectric filter shown in FIG. 2.
Figure 5A:
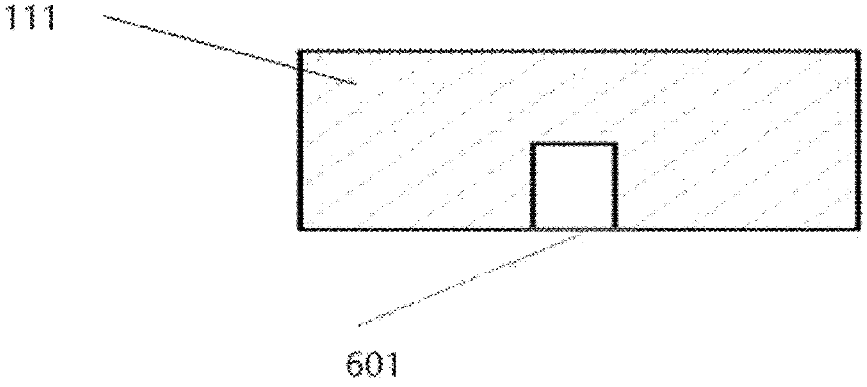
FIGS. 5A-5D are local sectional view of the area of the first main coupling window in which a blind hole or through hole is provided.
Figure 5B:
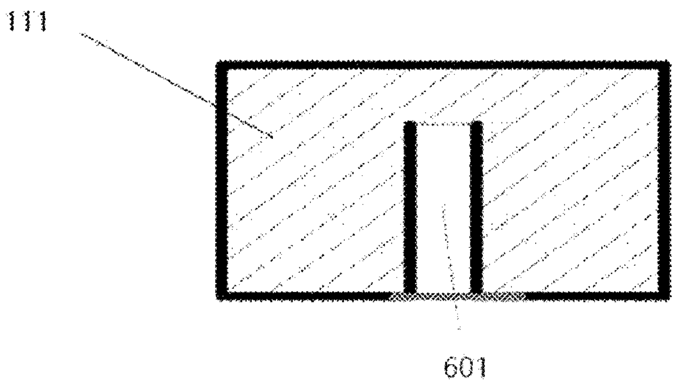
Figure 5C:
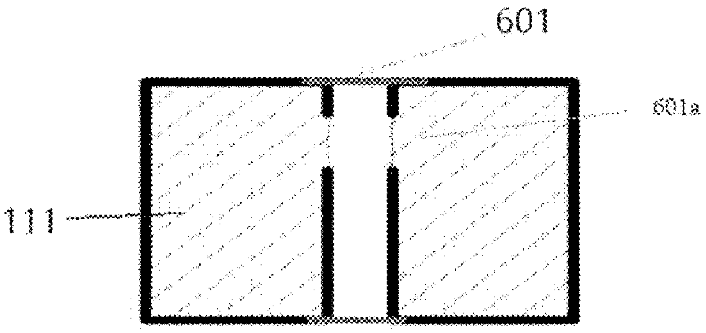
Figure 5D:
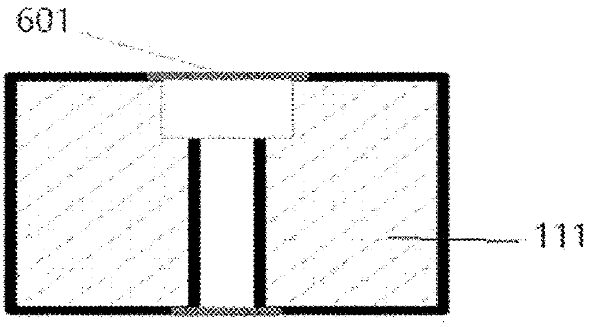

As shown in FIG. 4, a hole 601 for adjusting coupling is arranged in an area of the first main coupling window 111. The hole 601 may be a blind hole or a through hole. As shown in FIGS. 5A-5D, at least part of the hole wall surface of the hole 601 is metallized, for example, plated with a metal conductive coating. The hole 601 in FIG. 5A is a blind hole, of which both the side wall and bottom wall are metallized. Alternatively, as shown in FIG. 5B, the side wall of the blind hole is surface metallized, while the bottom wall of the hole is not surface metallized. The hole 601 in FIG. 5C is a through hole, which passes through an upper metal conductive layer of the first main coupling window area to open to the gap between the first single-mode dielectric resonator and the second single-mode dielectric resonator. A section 601*a* of the sidewall of the through hole is not surface metallized. In the embodiment shown in FIG. 5D, the hole 601 is a stepwise hole, in which an inner surface of a larger aperture portion of the hole is not applied with a metal conductive coating. Of course, the configuration of the hole 601 is not limited to the examples shown, but can be varied according to the specific situation. The cross-sectional shape of the hole 601 is not limited to the circle as shown in the drawings, but can be designed as, for example, a square, a rectangle or a polygon or the like. Due to the arrangement of the hole 601, the dielectric material in the first main coupling window area is no longer continuous in the area of the hole 601, but separated into different branches of signal transmission, leading to a change in a coupling amount. Thus, the coupling amount realized through the first main coupling window may be adjusted by the arrangement of the hole 601.

Figure 6:
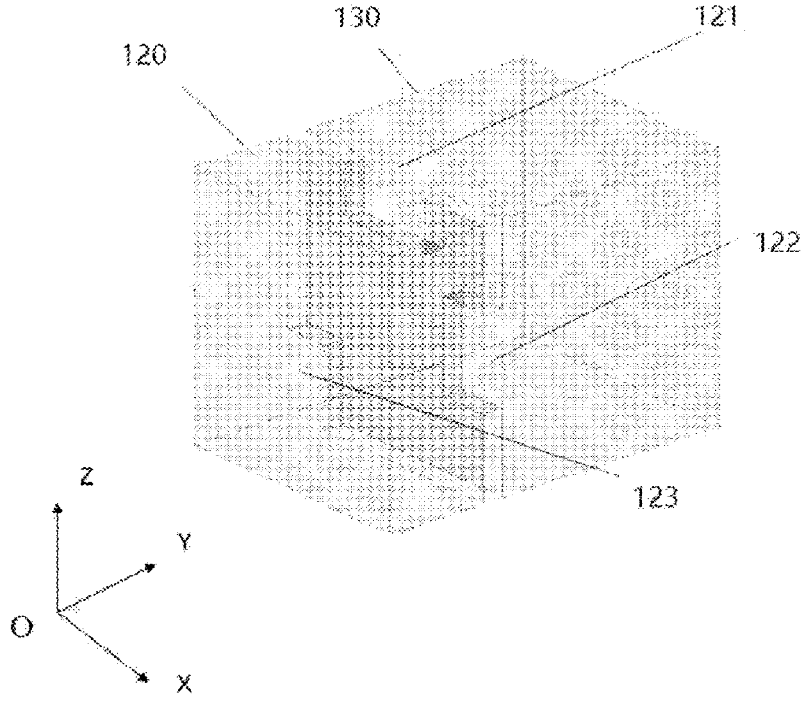
FIG. 6 is a three-dimensional schematic view of a portion of the dielectric filter of the present disclosure comprising a second single-mode dielectric resonator and a triple-mode dielectric resonator.
Figure 7A:
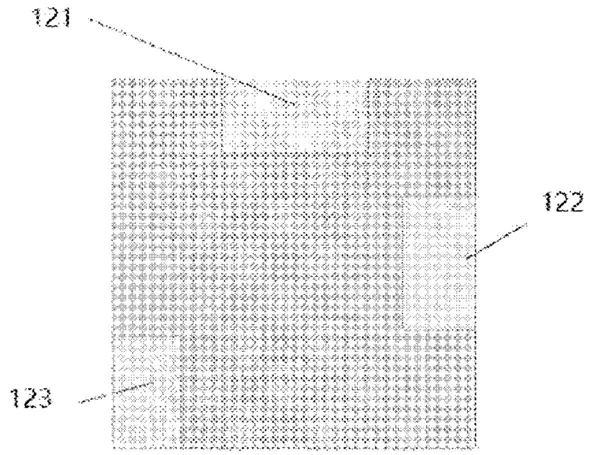
FIGS. 7A-7B are schematic diagrams of the cross section where the coupling windows between the second single-mode dielectric resonator and the triple-mode dielectric resonator are located.

As shown in FIGS. 1 and 6, the coupling windows between the second single-mode dielectric resonator 120 and the triple-mode dielectric resonator 130 include a first mode coupling window 121, a second mode coupling window 122, and a third mode coupling window 123. The first mode coupling window 121, the second mode coupling window 122, and the third mode coupling window 123 are arranged separately. Referring to FIG. 7A, the first mode coupling window 121 is located near the first edge of the filter cross section where the first mode coupling window 121 is located and is centrally arranged in the extension direction of the first edge. The second mode coupling window 122 is located near the second edge adjacent to the first edge in the filter cross section where the second mode coupling window 122 is located, and is centrally arranged in the extension direction of the second edge. The third mode coupling window 123 is located in a corner region opposite to an angle defined by the first edge and the second edge of the filter cross section where the third mode coupling window 123 is located. Specifically, the third mode coupling window 123 is close to ends of corresponding edges that are positioned in the corner region. With the help of the first mode coupling window 121, the second mode coupling window 122, and the third mode coupling window 123, the high-frequency spurious can be improved such that the performance of the filter is enhanced.

Figure 7B:
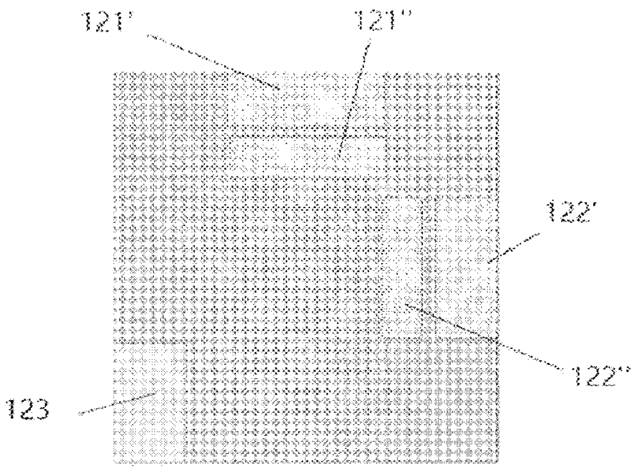

Referring to FIG. 7B, as a variant, the coupling windows between the second single-mode dielectric resonator 120 and the triple-mode dielectric resonator 130 may include a plurality of first-mode coupling windows 121', 121" arranged side by side in a direction perpendicular to the first edge. Optionally or additionally, the coupling windows between the second single-mode dielectric resonator 120 and the triple-mode dielectric resonator 130 may include a plurality of second-mode coupling windows 122', 122" arranged side by side in a direction perpendicular to the second edge.

Referring back to FIG. 1, the coupling windows between the triple-mode dielectric resonator 130 and the third single-mode dielectric resonator 140 include a first-mode transmission coupling window 131, a second-mode transmission coupling window 132 and a third-mode transmission coupling window 133. The first-mode transmission coupling window 131, the second-mode transmission coupling window 132 and the third-mode transmission coupling window 133 are arranged separately to transmit signals of respective modes. Similar to the first-mode coupling window 121, the first-mode transmission coupling window 131 is located near a first edge of the filter cross section where the first-mode transmission coupling window is located and is centrally arranged in the extension direction of the first edge. Similar to the second-mode coupling window 122, the second-mode transmission coupling window 132 is located near a second edge adjacent to the first edge in the filter cross section where the second-mode transmission coupling window 132 is located and is centrally arranged in the extension direction of the second edge. Similar to the third-mode coupling window 123, the third-mode transmission coupling window 133 is located in a corner region opposite to an angle defined by the first edge and the second edge of the filter cross section where the third-mode transmission coupling window 133 is located. Of course, similar to the coupling windows between the second single-mode dielectric resonator and the triple-mode dielectric resonator 130, the coupling windows between the third single-mode dielectric resonator 140 and the triple-mode dielectric resonator 130 may also include a plurality of first-mode transmission coupling windows arranged side by side in a direction perpendicular to the first edge and/or a plurality of second-mode transmission coupling windows arranged side by side in a direction perpendicular to the second edge. In a preferred embodiment, the coupling windows between the third single-mode dielectric resonator 140 and the triple-mode dielectric resonator 130 are mirror symmetrical with the coupling windows between the second single-mode dielectric resonator 120 and the triple-mode dielectric resonator 130 with respect to a central symmetry plane of the triple-mode dielectric resonator 130 perpendicular to the first direction Y.

Still referring to FIG. 1, the coupling windows between the fourth single-mode dielectric resonator 150 and the third single-mode dielectric resonator 140 include a second main coupling window 141 and a second cross coupling window 142. The second main coupling window 141 and the second cross coupling window 142 are arranged separately. The length of the second main coupling window 141 measured along the second direction X is greater than half of the length measured along the second direction X, of a filter cross section (i.e. in a Z-O-X plane) where the second main coupling window 141 is located. Similar to the first main coupling window 111, the width of the second main coupling window 141 measured along the third direction Z is less than half of the width measured along the third direction, of the filter cross section where the second main coupling window 141 is located. Similar to the first cross coupling window, the length of the second cross coupling window 142 measured along the second direction X is less than the length of the second main coupling window 141 measured along the second direction. Preferably, the length of the second cross coupling window 142 measured along the second direction X is less than half of the length of the second main coupling window 141 measured along the second direction. In a preferred embodiment, the coupling windows between the fourth single-mode dielectric resonator 150 and the third single-mode dielectric resonator 140 are configured to be mirror symmetrical with the coupling windows between the first single-mode dielectric resonator 110 and the second single-mode dielectric resonator 120 with respect to a central symmetry plane of the triple-mode dielectric resonator perpendicular to the first direction.

In the illustrated embodiment, the first single-mode dielectric resonator 110, the second single-mode dielectric resonator 120, the third single-mode dielectric resonator 140, the fourth single-mode dielectric resonator 150, and the triple-mode dielectric resonator 130 are ceramic dielectric resonators, that is, the dielectric material therein is a ceramic material. In a preferred embodiment, the dielectric filter is an integral device (i.e., a one-piece component). For example, it is integrally formed by a ceramic injection molding process, or by splicing the resonator blocks via welding. The coupling windows between adjacent dielectric resonators may be specifically embodied as an opening, a slot, or a channel. The metal conductive layer defining the boundary of the coupling window can be formed by electroplating or casting. In the illustrated embodiment, the coupling windows has a certain extension length in the Y direction. An air gap may be arranged around the coupling window between adjacent dielectric resonators. Of course, it can be understood that a metal sheet having a certain thickness can be provided in the air gap so that it forms a barrier against electric conduction between the two adjacent dielectric resonators in areas other than the area of coupling windows. The filter of the present disclosure can also be formed by connecting the dielectric resonator blocks by welding, and the coupling window(s) between adjacent dielectric resonators can be formed by removing metal materials from a predetermined area of the conductive metal layer on external surfaces of the dielectric resonator blocks by a process such as laser etching.

Although all coupling windows shown in FIG. 1 have a roughly rectangular cross-sectional shape, it should be understood that the cross sections of these coupling windows can be presented in regular shapes such as circle or polygon or irregular shapes. Coupling windows are spaced from each other, without shared or connected portions. The size of the coupling windows can also be set according to specific application scenarios. The position/location of the coupling windows can also vary according to specific needs. For example, if necessary, the position of the coupling windows shown in drawings in the filter cross section where it is located can be shifted from the edge area to the central area.

Although the dielectric filter shown in FIG. 1 has five dielectric resonators, it should be understood that the dielectric filter may only include a first single-mode dielectric resonator, a second single-mode dielectric resonator, and a triple-mode dielectric resonator arranged side by side in sequence, wherein the signal is input to the first single-mode dielectric resonator, transmitted through the second single-mode dielectric resonator and the triple-mode dielectric resonator, and output from the triple-mode dielectric resonator. Alternatively, the dielectric filter may comprise a first single-mode dielectric resonator, a second single-mode dielectric resonator, a triple-mode dielectric resonator, and a third single-mode dielectric resonator arranged side by side in sequence, wherein the signal is input to the first single-mode dielectric resonator, transmitted through the second single-mode dielectric resonator, the triple-mode dielectric resonator, and the third single-mode dielectric resonator, and finally output from the third single-mode dielectric resonator.

"Side by side in sequence" herein is not limited to strict linear arrangement of the dielectric resonators. For example, according to a specific space requirement, the dielectric resonators may be arranged such that the filter has a certain curved angle viewed along the overall extension direction. That is, the first direction Y, which mainly represents the longitudinal extension direction of the dielectric filter, is not limited to the overall linear extension shown in the drawings.

Figure 8:
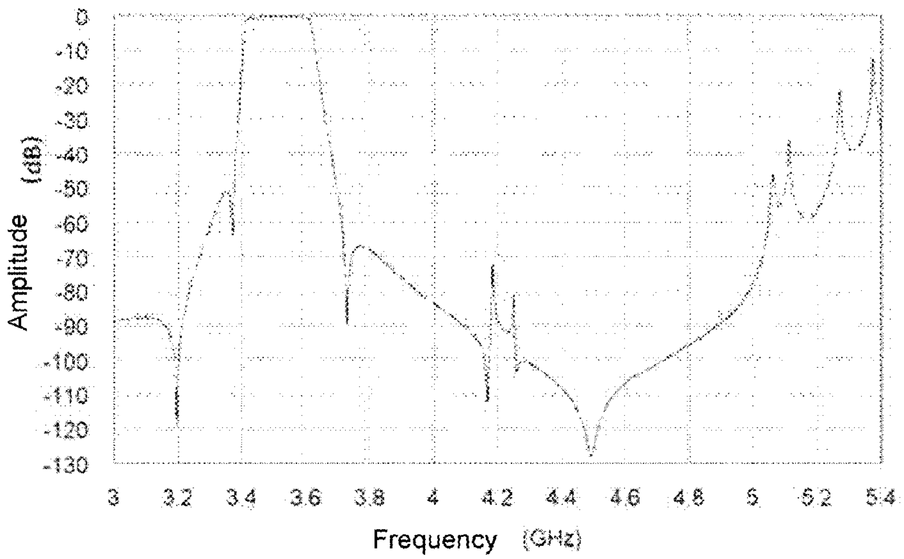
FIG. 8 is a schematic diagram of the S parameter performance curve of the dielectric filter according to the present disclosure.

As shown in FIG. 8, the S parameter performance curve of the dielectric filter of the present disclosure shows that the out-of-band spurious has been significantly improved. The dielectric filter of the present disclosure has a smaller size and a lighter weight, leading to a simplified and flexible design, which improves the production efficiency and saves the cost. In addition, it has a better filter performance and RF performance, as well as improved reliability and robustness.

References in the present disclosure to "an embodiment", "another embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

REFERENCE SIGNS

1. Dielectric filter;
110. First single-mode dielectric resonator;
120. Second single-mode dielectric resonator;
130. Triple-mode dielectric resonator;
140. Third single-mode dielectric resonator;

150. Fourth single-mode dielectric resonator;
111. First main coupling window;
112, 112', 112". First cross coupling window;
601. Hole;
601*a*. Section
121, 121', 121". First-mode coupling window,
122, 122', 122". Second-mode coupling window;
123. Third-mode coupling window,
131. First-mode transmission coupling window,
132. Second-mode transmission coupling window,
133. Third-mode transmission coupling window,
141. Second main coupling window,
142. Second cross coupling window.

What is claimed is:

1. A dielectric filter (1), comprising:

a first single-mode dielectric resonator (110), a second single-mode dielectric resonator (120), and a triple-mode dielectric resonator (130) arranged side by side in sequence in a first direction (Y), the first single-mode dielectric resonator, the second single-mode dielectric resonator, and the triple-mode dielectric resonator being coupled by coupling windows provided between opposite surfaces of adjacent ones of the first single-mode dielectric resonator, the second single-mode dielectric resonator, and the triple-mode dielectric resonator, characterized in that, the coupling windows between the first single-mode dielectric resonator (110) and the second single-mode dielectric resonator (120) comprise a first main coupling window (111) and a first cross coupling window (112), the first main coupling window and the first cross coupling window being arranged separately from each other, a length of the first main coupling window (111) measured along a second direction (X) is greater than half of a length measured along the second direction, of a filter cross section where the first main coupling window is located, and a width of the first main coupling window (111) measured along a third direction (Z) is less than half of a width measured along the third direction, of the filter cross section where the first main coupling window is located, the first direction, the second direction and the third direction being three dimensional extension directions of the dielectric filter, a length of the first cross coupling window (112) measured along the second direction is less than the length of the first main coupling window (111) measured along the second direction.

2. The dielectric filter (1) according to claim 1, characterized in that the length of the first cross coupling window (112) measured along the second direction is less than half of the length of the first main coupling window measured along the second direction.

3. The dielectric filter (1) according to claim 1, characterized in that the length of the first main coupling window (111) measured along the second direction (X) is substantially equal to the length measured along the second direction, of the filter cross section where the first main coupling window is located.

4. The dielectric filter (1) according to claim 3, characterized in that the first main coupling window (111) is located at an edge area of the filter cross section where the first main coupling window is located.

5. The dielectric filter (1) according to claim 4, characterized in that a blind hole or through hole for adjusting coupling is provided in an area where the first main coupling window (111) is located.

6. The dielectric filter (1) according to claim 5, characterized in that at least part of a hole wall surface of the blind hole or through hole is metallized.

7. The dielectric filter (1) according to claim 1, characterized in that the coupling windows between the first single-mode dielectric resonator (110) and the second single-mode dielectric resonator (120) include a plurality of the first cross coupling windows.

8. A dielectric filter (1), comprising:

a first single-mode dielectric resonator (110), a second single-mode dielectric resonator (120), and a triple-mode dielectric resonator (130) arranged side by side in sequence in a first direction (Y), the first single-mode dielectric resonator, the second single-mode dielectric resonator, and the triple-mode dielectric resonator being coupled by coupling windows provided between opposite surfaces of adjacent ones of the first single-mode dielectric resonator, the second single-mode dielectric resonator, and the triple-mode dielectric resonator, characterized in that, the coupling windows between the first single-mode dielectric resonator (110) and the second single-mode dielectric resonator (120) comprise a first main coupling window (111) and a first cross coupling window (112), a length of the first main coupling window (111) measured along a second direction (X) is greater than half of a length measured along the second direction, of a filter cross section where the first main coupling window is located, and a width of the first main coupling window (111) measured along a third direction (Z) is less than half of a width measured along the third direction, of the filter cross section where the first main coupling window is located, the first direction, the second direction and the third direction being three dimensional extension directions of the dielectric filter, a length of the first cross coupling window (112) measured along the second direction is less than the length of the first main coupling window (111) measured along the second direction, wherein the coupling windows between the second single-mode dielectric resonator (120) and the triple-mode dielectric resonator (130) comprise a first mode coupling window (121), a second mode coupling window (122) and a third mode coupling window (123); the first mode coupling window (121), viewed in terms of a shape of a filter cross section where it is located, is located near a first edge of the shape and is centrally arranged in an extension direction of the first edge, the second mode coupling window (122), viewed in terms of a shape of a filter cross section where it is located, is located near a second edge of the shape adjacent to the first edge and is centrally arranged in an extension direction of the second edge, and the third mode coupling window (123), viewed in terms of a shape of a filter cross section where it is located, is located in a corner region of the shape that is opposite to an angle defined by the first edge and the second edge.

9. The dielectric filter (1) according to claim 8, characterized in that the coupling windows between the second single-mode dielectric resonator (120) and the triple-mode dielectric resonator (130) include a plurality of the first mode coupling windows arranged side by side in a direction perpendicular to the first edge and/or a plurality of the second mode coupling windows arranged side by side in a direction perpendicular to the second edge.

10. The dielectric filter (1) according to claim 8, characterized in that the dielectric filter comprises a third single-mode dielectric resonator (140) arranged side by side with respect to the triple-mode dielectric resonator (130) in the first direction (Y).

11. The dielectric filter (1) according to claim 10, characterized in that the coupling windows between the third single-mode dielectric resonator (140) and the triple-mode dielectric resonator (130) comprise a first mode transmission coupling window (131), a second mode transmission coupling window (132) and a third mode transmission coupling window (133), wherein the first mode transmission coupling window (131), viewed in terms of a shape of a filter cross section where it is located, is located near a first edge of the shape and is centrally arranged in an extension direction of the first edge, the second mode transmission coupling window (132), viewed in terms of a shape of a filter cross section where it is located, is located near a second edge of the shape adjacent to the first edge and is centrally arranged in an extension direction of the second edge, and the third mode transmission coupling window (133), viewed in terms of a shape of a filter cross section where it is located, is located in a corner region of the shape that is opposite to an angle defined by the first edge and the second edge.

12. The dielectric filter (1) according to claim 11, characterized in that the coupling windows between the third single-mode dielectric resonator (140) and the triple-mode dielectric resonator (130) are mirror symmetrical with the coupling windows between the second single-mode dielectric resonator (120) and the triple-mode dielectric resonator (130) with respect to a central symmetry plane of the triple-mode dielectric resonator (130) perpendicular to the first direction.

13. The dielectric filter (1) according to claim 10, characterized by comprising a fourth single-mode dielectric resonator (150) arranged side by side with respect to the third single-mode dielectric resonator (140) in the first direction (Y).

14. The dielectric filter (1) according to claim 13, characterized in that the coupling windows between the fourth single-mode dielectric resonator (150) and the third single-mode dielectric resonator (140) comprise a second main coupling window (141) and a second cross coupling window (142), wherein a length of the second main coupling window (141) measured along the second direction is greater than half of a length measured along the second direction (X), of a filter cross section where the second main coupling window is located, a width of the second main coupling window (141) measured along the third direction (Z) is less than half of a width measured along the third direction, of the filter cross section where the second main coupling window is located, and a length of the second cross coupling window (142) measured along the second direction (X) is less than the length of the second main coupling window (141) measured along the second direction.

15. The dielectric filter (1) according to claim 14, characterized in that the length of the second cross coupling window (142) measured along the second direction is less than half of the length of the second main coupling window (141) measured along the second direction.

16. The dielectric filter (1) according to claim 14, characterized in that the coupling windows between the fourth single-mode dielectric resonator (150) and the third single-mode dielectric resonator (140) are configured to be mirror symmetric with the coupling windows between the first single-mode dielectric resonator (110) and the second single-mode dielectric resonator (120) with respect to a central symmetry plane of the triple-mode dielectric resonator perpendicular to the first direction.

17. The dielectric filter (1) according to claim 14, characterized in that the first single-mode dielectric resonator (110), the second single-mode dielectric resonator (120), the third single-mode dielectric resonator (140), the fourth single-mode dielectric resonator (150), and the triple-mode dielectric resonator (130) are ceramic dielectric resonators.

18. The dielectric filter (1) according to claim 1, characterized in that the dielectric filter is an integral device.

19. A dielectric filter, comprising:

a first single-mode dielectric resonator, a second single-mode dielectric resonator, a triple-mode dielectric resonator, and a third single-mode dielectric resonator arranged side by side in sequence in a first direction (Y), the first single-mode dielectric resonator, the second single-mode dielectric resonator, the triple-mode dielectric resonator, and the third single-mode dielectric resonator being coupled by coupling windows provided therebetween, characterized in that, the coupling windows between the first single-mode dielectric resonator and the second single-mode dielectric resonator comprise a first main coupling window and a first cross coupling window, a length of the first main coupling window measured along a second direction (X) is greater than half of a length measured along the second direction, of a filter cross section where the first main coupling window is located, and a width of the first main coupling window measured along a third direction (Z) is less than half of a width measured along the third direction, of the filter cross section where the first main coupling window is located, the first direction, the second direction and the third direction being three dimensional extension directions of the dielectric filter, a length of the first cross coupling window measured along the second direction is less than the length of the first main coupling window measured along the second direction, and the coupling windows between the triple-mode dielectric resonator and the third single-mode dielectric resonator comprise a first mode transmission coupling window, a second mode transmission coupling window and a third mode transmission coupling window, wherein the first mode transmission coupling window, viewed in terms of a shape of a filter cross section where it is located, is located near a first edge of the shape and is centrally arranged in an extension direction of the first edge, the second mode transmission coupling window, viewed in terms of a shape of a filter cross section where it is located, is located near a second edge of the shape adjacent to the first edge and is centrally arranged in an extension direction of the second edge, and the third mode transmission coupling window, viewed in terms of a shape of a filter cross section where it is located, is located in a corner region of the shape that is opposite to an angle defined by the first edge and the second edge.

* * * * *